US012592440B2

(12) United States Patent
Yu et al.

(10) Patent No.: US 12,592,440 B2
(45) Date of Patent: Mar. 31, 2026

(54) BATTERY PACK CASING HAVING CRUSH RESISTANCE AND THERMAL INSULATION FOR ELECTRIFIED VEHICLE

(71) Applicant: FCA US LLC, Auburn Hills, MI (US)

(72) Inventors: Huiyang Yu, Shanghai (CN); Cuicui Zhang, Shanghai (CN); Jingjing Zhao, Shanghai (CN); Gang Wang, Shanghai (CN); Liang Hou, Shanghai (CN); Caizhen Sun, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 284 days.

(21) Appl. No.: 18/456,654

(22) Filed: Aug. 28, 2023

(65) Prior Publication Data

US 2025/0079601 A1 Mar. 6, 2025

(51) Int. Cl.
H01M 50/242 (2021.01)
B60K 1/04 (2019.01)
H01M 50/249 (2021.01)

(52) U.S. Cl.
CPC ............. H01M 50/242 (2021.01); B60K 1/04 (2013.01); H01M 50/249 (2021.01); B60K 2001/0438 (2013.01); H01M 2220/20 (2013.01)

(58) Field of Classification Search
CPC ............. H01M 50/242; H01M 50/249; H01M 2220/20; H01M 10/625; H01M 10/658; B60K 1/04; B60K 2001/0438
See application file for complete search history.

(56) References Cited

U.S. PATENT DOCUMENTS

| | | | | |
|---|---|---|---|---|
| 2021/0257661 A1* | 8/2021 | Kobayashi | .......... | H01M 50/204 |
| 2022/0212530 A1* | 7/2022 | Rausch | .................. | B60K 11/02 |

FOREIGN PATENT DOCUMENTS

| | | | | | |
|---|---|---|---|---|---|
| CN | 208939025 U | * | 6/2019 | .............. | H01M 2/10 |
| CN | 209941974 U | * | 1/2020 | .............. | E04B 2/74 |
| CN | 212161894 U | * | 12/2020 | .............. | H01M 2/10 |
| DE | 102017220724 A1 | * | 5/2019 | .............. | B60K 1/04 |
| DE | 102021124831 A1 | * | 3/2023 | ........ | H01M 10/0481 |

\* cited by examiner

*Primary Examiner* — Tisha D Lewis
(74) *Attorney, Agent, or Firm* — Jeremy J. Klobucar

(57) ABSTRACT

A battery pack assembly configured to be coupled to a battery housing for an electrified vehicle includes a battery case and an air column assembly. The battery case has a bottom surface, a forward wall, a rearward wall, a first sidewall and a second sidewall. The air column assembly is supported within the battery case and includes a first, second and third plurality of air columns. The first plurality of air columns are positioned along the bottom surface of the battery case. The second plurality of air columns are positioned outboard of the first plurality of air columns. The third plurality of air columns are positioned outboard of the second plurality of air columns and engage the forward wall, rearward wall, first sidewall and second sidewall of the battery case in an installed position. The battery case assembly mitigates impact damage to the battery housing in the installed position.

17 Claims, 5 Drawing Sheets

BATTERY PACK CASING HAVING CRUSH RESISTANCE AND THERMAL INSULATION FOR ELECTRIFIED VEHICLE

FIELD

The present application generally relates to electrified vehicles and, more particularly, to a battery pack casing having air columns that provide crush resistance and thermal insulation for a battery pack housing.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor.

The high voltage battery system generally includes a battery pack assembly that includes a housing that houses one or more battery packs. Typically, the battery pack assembly is mounted under the chassis of the vehicle. In some instances, vehicle vibration and/or impact loads experienced during driving can cause deformation and/or damage of battery pack components including battery cells, cooling plates associated with the battery pack and the battery pack assembly as a whole. Some battery pack housings incorporate additional metal protection plates that provide some impact mitigation but these solutions can be high cost and do not provide any thermal insulation. Accordingly, while such conventional housings for battery pack assemblies do work well for their intended purpose, there exists an opportunity for improvement in the relevant art.

SUMMARY

According to one example aspect of the invention, a battery pack assembly configured to be coupled to a battery housing for an electrified vehicle includes a battery case and an air column assembly. The battery case has a bottom surface, a forward wall, a rearward wall, a first sidewall and a second sidewall. The air column assembly is supported within the battery case and includes a first, second and third plurality of air columns. The first plurality of air columns are positioned along the bottom surface of the battery case. The second plurality of air columns are positioned outboard of the first plurality of air columns. The third plurality of air columns are positioned outboard of the second plurality of air columns and engage the forward wall, rearward wall, first sidewall and second sidewall of the battery case in an installed position. The battery case assembly mitigates impact damage to the battery housing in the installed position.

In some implementations, the first plurality of air columns are rectangular in shape and extend laterally between opposing air columns of the second plurality of air columns. The second plurality of air columns are cylindrical in shape and arranged in a side-by-side manner. Adjacent air columns of the second plurality of air columns define axes that are parallel and offset relative to each other. The third plurality of air columns are cylindrical in shape and arranged in a side-by-side manner. Adjacent air columns of the third plurality of air columns define axes that are parallel and offset relative to each other. Air columns of the third plurality of air columns are smaller in diameter and longer in length than the air columns of the second plurality of air columns.

In some implementations, the battery pack housing nests laterally between the air columns of the third plurality of air columns. The battery case assembly is press fit around the battery pack housing in the assembled position. Th air columns of the first, second and third plurality of air columns are formed of flexible material. In examples, the flexible material is silicone.

In some examples, the case defines outset sections formed at transitions from the rearward wall and the side walls. The outlet sections are shaped to receive tabs extending from the battery pack housing.

According to another example aspect of the invention, a battery case assembly configured to be coupled to a battery housing for an electrified vehicle includes a battery case and an air column assembly. The battery case has a bottom surface, a forward wall, a rearward wall, a first sidewall and a second sidewall. The air column assembly is supported within the battery case and includes a first plurality of air columns positioned along the bottom surface of the battery case. A plurality of outboard air columns are positioned outboard of the first plurality of air columns and engage the forward wall, rearward wall, first sidewall and second sidewall of the battery case in an installed position. The battery case assembly nests laterally between the air columns of the plurality of outboard air columns. The battery case assembly thermally insulates the battery housing in the installed position.

In some implementations, the battery case assembly further includes an intermediate plurality of air columns. The intermediate plurality of air columns are cylindrical in shape and arranged in a side-by-side manner. Adjacent air columns of the intermediate plurality of air columns define axes that are parallel and offset relative to each other. The outboard plurality of air columns are cylindrical in shape and arranged in a side-by-side manner. Adjacent air columns of the outboard plurality of air columns define axes that are parallel and offset relative to each other. The air columns of the outboard plurality of air columns are smaller in diameter and longer in length than the air columns of the intermediate plurality of air columns.

In examples, the air columns of the first, intermediate, and outboard plurality of air columns are formed of flexible material. In examples, the flexible material includes silicone.

In other examples, the case defines outset sections formed at transitions from the rearward wall and the side walls. The outlet sections are shafted to receive tabs extending from the battery pack housing.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, a high voltage battery system generally includes a battery pack assembly that includes a housing that houses one or more battery packs. Typically, the battery pack assembly includes a cooling system wherein a cooling liquid is circulated along one or more cooling plates for cooling the battery packs and the battery pack assembly. In some battery pack assemblies, there are multiple cooling plates arranged in multiple layers within the battery pack assembly. In some instances, gravel bombardment and/or impact loads experienced during driving of the vehicle can cause damage of components in a battery pack such as the battery cells, frame members and cooling plates. Over the life of a vehicle, such repeated impacts experienced by the battery packs can lead to deformation of battery pack components including the cooling plate. In this regard, over time, such impacts can ultimately lead to failure of one or more components of the battery pack such as a cracking or rupture of one of the cooling plates. Further, the surrounding frame members can also experience such damage or cracking due to repeated impacts.

Accordingly, the battery case assembly of the instant disclosure incorporates a battery case assembly having a case and a plurality of strategically placed air columns between the case and the battery pack. When the case assembly is installed relative to the battery pack, the case and air columns can inhibit impact damage to the components of the battery pack. In addition, the case assembly provides thermal insulation to the battery pack. In particular, the present disclosure provides a cost effective supplemental case design that mitigates any potential damage to the components of the battery pack including the battery cells, cooling plates and surrounding frame assembly during the life of the vehicle such as from impacts and gravel bombardment. As a result, the overall anti-impact, vibration absorption and thermal insulation ability of the battery pack as a whole is effectively enhanced.

Figure 1:
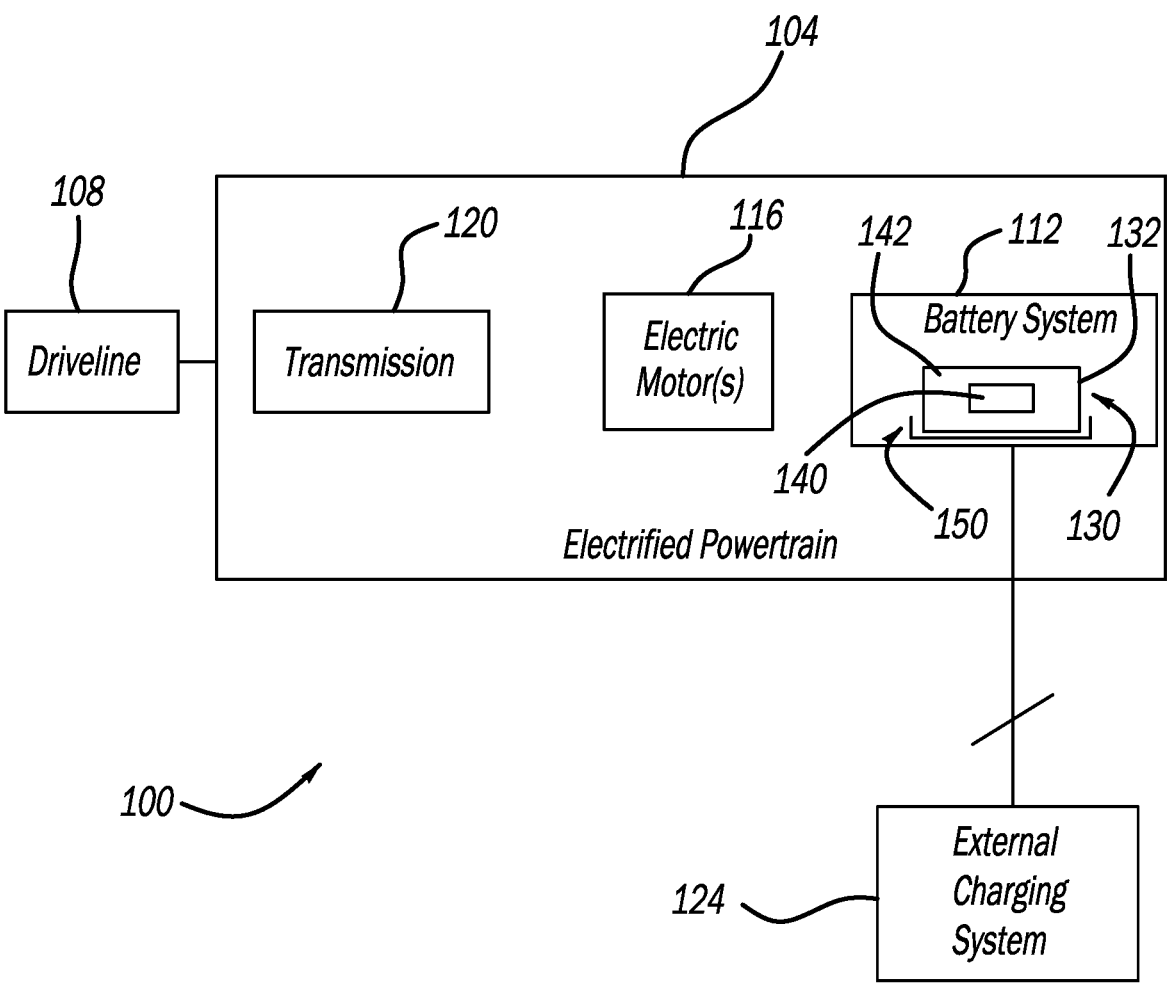
FIG. 1 is a functional block diagram of an electrified vehicle having a battery system including a battery pack assembly according to the principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 configured to generate and transfer drive torque to a driveline 108 of the vehicle 100 for propulsion. The electrified powertrain 104 generally comprises a high voltage battery system 112 (also referred to herein as "battery system 112"), one or more electric motors 116, and a transmission 120. The battery system 112 is selectively connectable (e.g., by the driver) to an external charging system 124 (also referred to herein as "charger 124") for charging of the battery system 112. The battery system 112 includes at least one battery pack assembly 130. In examples, the battery pack assembly 130 can generally include a battery housing 132 that houses batteries 140. Cooling plates 142 are generally disposed in the battery housing that route cooling liquid for cooling the batteries 140. According to the present disclosure, a battery case assembly 150 is disposed around the battery pack housing 132.

Figure 2:
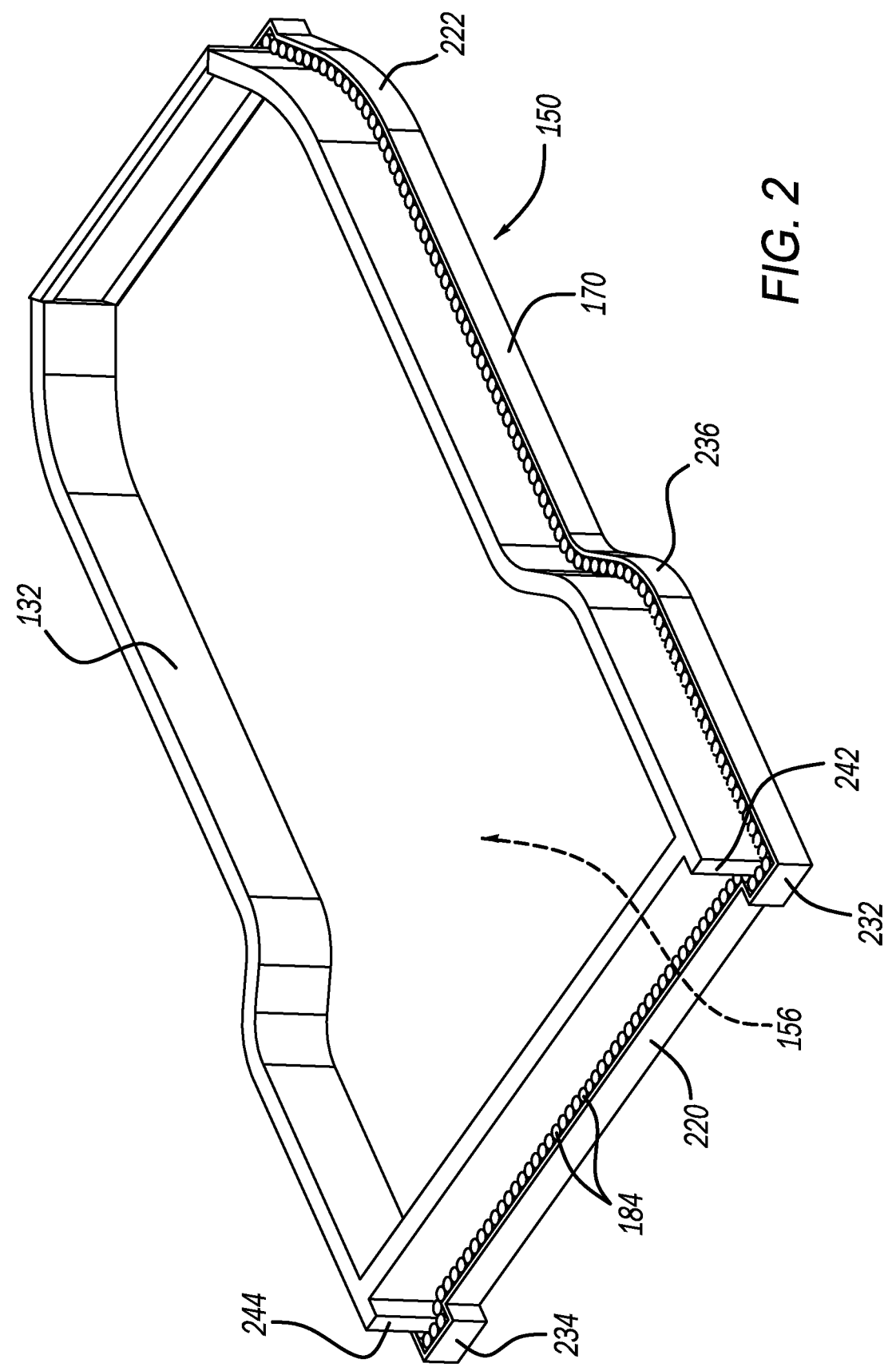
FIG. 2 is a top perspective view of a battery pack case assembly installed onto a battery pack housing according to the principles of the present application.

With continued reference to FIG. 1 and additional reference to FIGS. 2-4, additional features of the instant battery pack assembly 130 and case assembly 150 will be described. FIG. 2 illustrates an exemplary battery pack housing 132. It will be appreciated that additional housing components may be included with the battery pack housing 132 as a housing assembly. For purposes of this discussion, the battery pack housing 132 is a portion of the battery pack housing assembly that interacts with the battery case assembly 150. As will become appreciated from the following discussion, the battery case assembly 150 is connected or otherwise disposed around at least a portion of the battery pack housing 132. The battery case assembly 150 is configured to be mounted around an underside or ground facing side 156 of the battery pack housing 132. In particular, the battery case assembly 150 is configured to be located between the battery pack housing 132 and the ground such that any impact (such as from road debris) or gravel bombardment that would otherwise hit the battery pack housing 132 is instead directed onto and absorbed by the battery case assembly 150.

Figure 3:
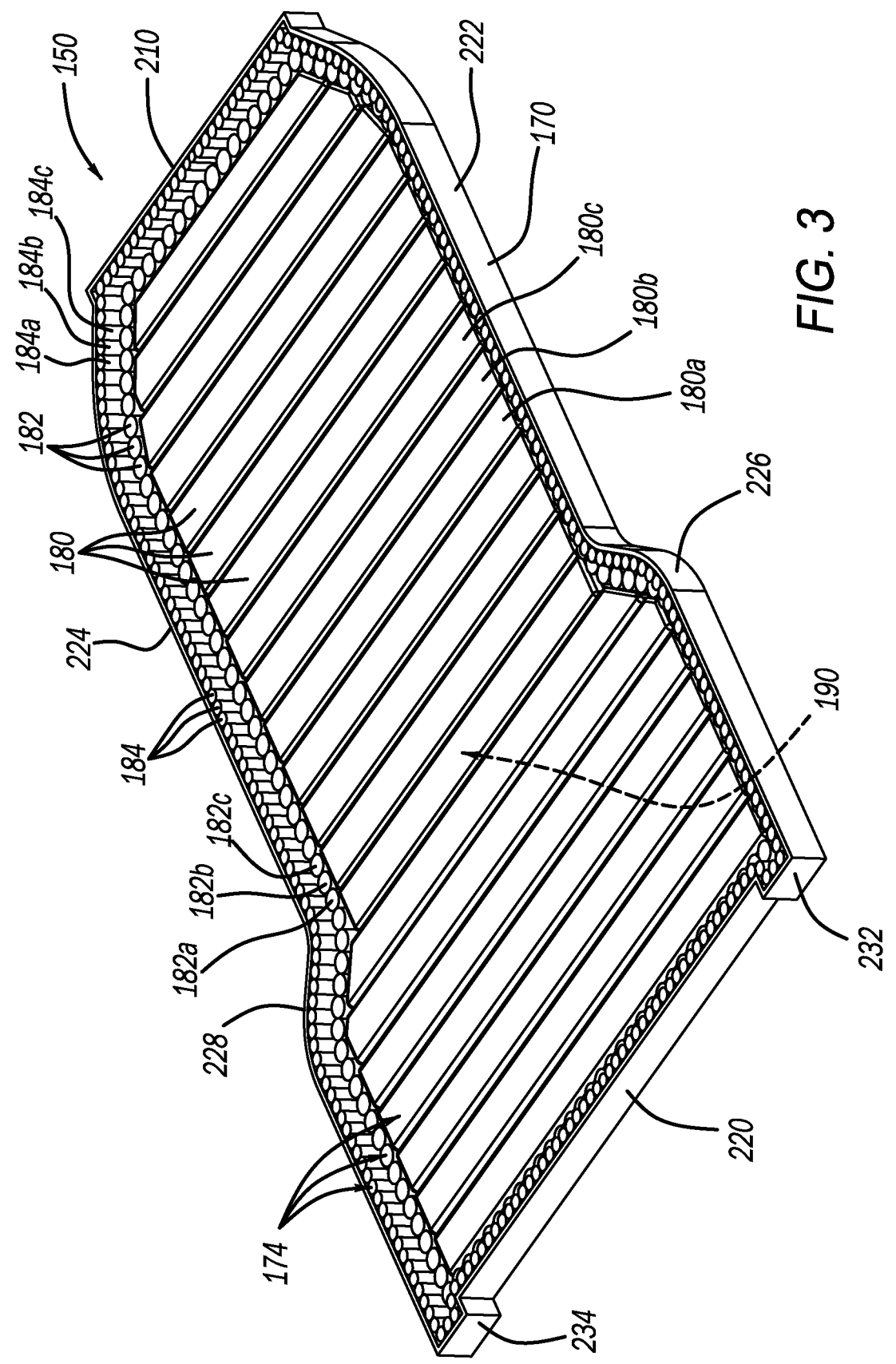
FIG. 3 is a top perspective view of the battery pack case assembly according to the principles of the present application.
Figure 4:
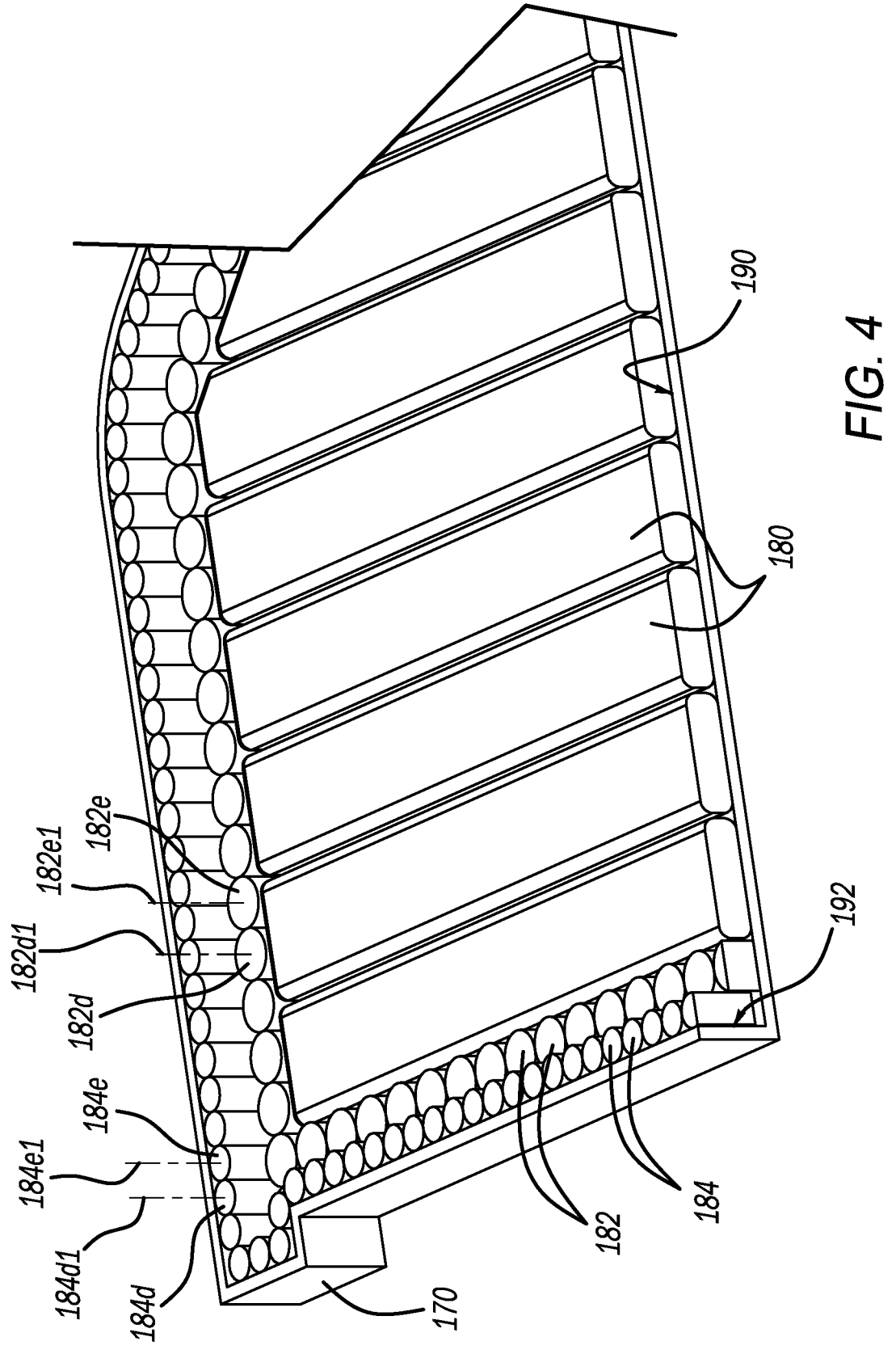
FIG. 4 is a partial sectional view of the battery pack case assembly installed onto the battery pack housing of FIG. 2.

The battery case assembly 150 generally includes a battery case 170 that generally contains an air column assembly collectively identified at reference 174 (FIG. 3). The air column assembly 174 is supported by and within the battery case 170. The air column assembly 174 includes a first plurality of air columns collectively identified at 180, a second or intermediate plurality of air columns collectively identified at 182 and a third or outboard plurality of air columns collectively identified at 184. The first plurality of air columns 180 are individually identified at reference numerals 180a, 180b, 180c, etc. The second plurality of air columns 182 are individually identified at reference numerals 182a, 182b, 182c, etc. The third plurality of air columns 184 are individually identified at reference numerals 184a, 184b, 184c, etc.

In the example shown, the first plurality of air columns 180 are larger than the second plurality of air columns 182 and the third plurality of air columns 184. The first plurality of air columns 180 are positioned along a planar interior bottom surface 190 (FIG. 4) of the case 170. The second plurality of air columns 182 are positioned generally outboard of the first plurality of air columns 180. In examples, the second plurality of air columns 182 generally surround the first plurality of air columns 180. The third plurality of air columns 184 are positioned generally outboard of the second plurality of air columns 182. In one example, the third plurality of air columns 184 generally surround the second plurality of air columns 182. In examples, the third plurality of air columns 184 are positioned against an interior facing wall 192 extending from the case 170.

In the example shown, the air columns of the first plurality of air columns 180 are generally rectangular in shape and extend laterally between opposing second air columns 182. The air columns of the second plurality of air columns 182 are generally cylindrical in shape and arranged in a side-by-side manner. In examples, adjacent air columns of the second plurality of air columns 182 engage each other. The air columns of the second plurality of air columns 182 generally define axes that are parallel and offset to each other. As viewed in FIG. 4, air column 182d defines an axis 182d1 that is parallel and offset relative to an axis 182e1 of air column 182e.

The air columns of the third plurality of air columns 184 are generally cylindrical in shape and arranged in a side-by-side manner. In examples, adjacent air columns of the third plurality of air columns 184 engage each other. The air columns of the third plurality of air columns 184 generally define axes that are parallel and offset to each other. As viewed in FIG. 4, air column 184d defines an axis 184d1 that is parallel and offset relative to an axis 184e1 of air column 184e. The air columns of the third plurality of air columns 184 are generally smaller in diameter and longer in length than the air columns of the second plurality of air columns 182.

Once the battery case assembly 150 is installed onto the underside of the battery pack housing 132, as shown in FIG. 2, the battery pack housing 132 generally nests laterally between the air columns of the third plurality of air columns 184. At the same time, the underside 156 of the battery housing 132 sits on top of the air columns of the first plurality of air columns 180 and on top of the air columns of the second plurality of air columns 182. In examples, the battery case assembly 150 can achieve a press-fit around the battery pack housing 132. Additionally or alternatively, mechanical fasteners and chemical adhesives can be used to affix the battery case assembly 150 to the battery pack housing 132. In additional examples, the battery pack housing 132 and battery case assembly 150 can be formed as a single unit.

The air columns 180, 182 and 184 can be formed of durable and flexible material such as silicon and filled with air. The air columns 180, 182 and 184 have resilience and can withstand and distribute impact loads protecting the battery pack housing 132 and the batteries 140 and cooling plate(s) 142. It is contemplated that the battery pack housing 132 can be formed with reduced thickness when used with the battery case assembly 150 thereby reducing weight and cost. The battery case assembly 150 can be replaced when damaged.

When the battery case assembly 150 is installed onto the underside of the battery pack housing 132, the battery case assembly 150 can intercept any road debris including rocks that would otherwise be directly impacted into the battery pack housing 132. Because impact forces are not as easily transmitted onto the battery pack housing 132, the life of the battery pack housing 132 is extended. Further, the battery case assembly 150 provides an insulation function that further provides favorable thermal management in high and low temperature environments.

With particular reference now to FIG. 3, additional features of the battery case assembly 150 will be described. The case 170 generally includes a forward wall 210, a rearward wall 220, a first side wall 222 and a second side wall 224. The first and second side walls 222 and 224 have outward flange sections 226 and 228 respectively. Outset sections 232 and 234 are formed at transitions from the rearward wall 220 and the side walls 222 and 224. The outlet sections 232 and 234 are shaped to receive tabs 242 and 244 extending from the battery pack housing 132. The third plurality of air columns 184 engage the forward wall 210, the rearward wall 220, the first side wall 222 and the second side wall 224. The shape of the case 170 is generally complementary to the shape of the battery pack housing 132 (FIG. 2). It is appreciated that the case 170 and battery case assembly 150 as a whole can be shaped differently to accommodate battery pack housings having different shapes within the scope of this disclosure.

It will be appreciated that while the air column assembly 174 has been shown with three distinct air column assemblies having unique shapes, the present disclosure is not so limited. In this regard, the air column assembly 174 can include additional or fewer air columns having other shapes. It will be appreciated, that the air column assembly 174 (and/or the case 170) can be configured differently to be optimized with respect to battery pack housings having other shapes and sizes.

Figure 5A:
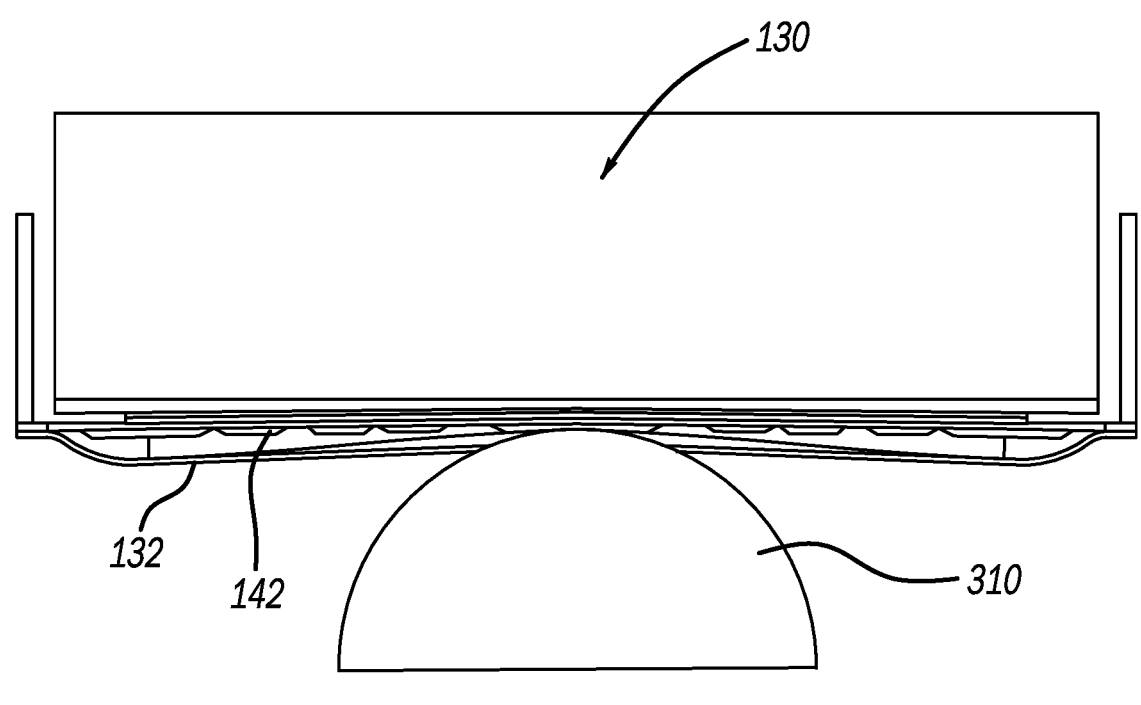
FIG. 5A is a side view of an exemplary impact experienced by a battery pack assembly that does not incorporate a battery pack case assembly of the present disclosure.
Figure 5B:
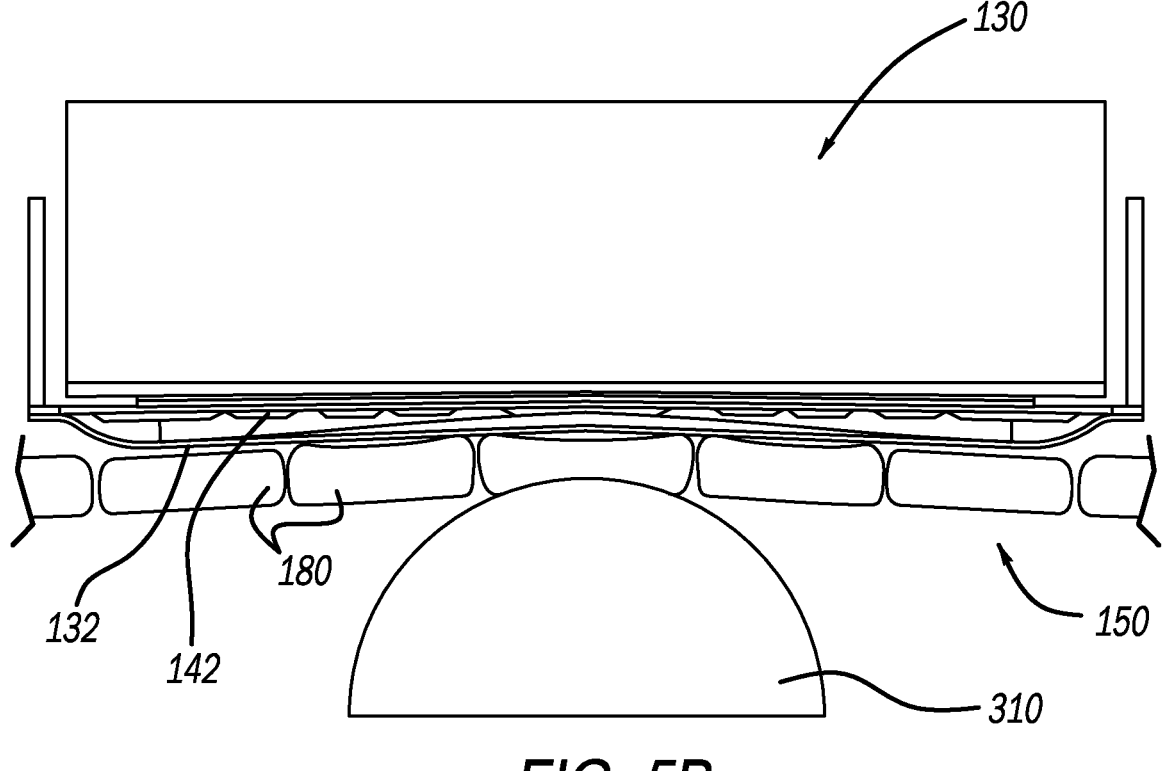
FIG. 5B is a side view of an exemplary impact experienced by a battery pack assembly that incorporates a battery pack case assembly of the present disclosure.

Turning now to FIGS. 5A and 5B, an impact load 310 is shown impacting a battery pack assembly 130 without the battery case assembly 150 (FIG. 5A) and impacting a battery pack assembly 130 with the battery case assembly 150 according to the present disclosure. Simulations reveal that an air column 180 having a 2 mm thickness can decrease the plastic strain experienced by the cooling plate 142 from 26.5% (FIG. 5A), to 20.9% (FIG. 5B).

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A battery case assembly configured to be coupled to a battery housing for an electrified vehicle, the battery case assembly comprising:
   a battery case having a bottom surface, a forward wall, a rearward wall, a first side wall and a second side wall; and
   an air column assembly supported within the battery case and comprising:
      a first plurality of air columns positioned along the bottom surface of the battery case;
      a second plurality of air columns positioned outboard of the first plurality of air columns;
      a third plurality of air columns positioned outboard of the second plurality of air columns and that engage the forward wall, rearward wall, first side wall and second side wall of the battery case in an installed position;
   wherein the battery case assembly mitigates impact damage to the battery housing in the installed position.

2. The battery case assembly of claim 1, wherein the first plurality of air columns are rectangular in shape and extend laterally between opposing air columns of the second plurality of air columns.

3. The battery case assembly of claim 2, wherein the second plurality of air columns are cylindrical in shape and arranged in a side-by-side manner wherein adjacent air columns of the second plurality of air columns define axes that are parallel and offset relative to each other.

4. The battery case assembly of claim 3, wherein the third plurality of air columns are cylindrical in shape and arranged in a side-by-side manner wherein adjacent air columns of the third plurality of air columns define axes that are parallel and offset relative to each other.

5. The battery case assembly of claim 4, wherein the air columns of the third plurality of air columns are smaller in diameter and longer in length than the air columns of the second plurality of air columns.

6. The battery case assembly of claim 1, wherein the battery pack housing nests laterally between the air columns of the third plurality of air columns.

7. The battery case assembly of claim 6, wherein the battery case assembly is press fit around the battery pack housing in the assembled position.

8. The battery case assembly of claim 1, wherein the air columns of the first, second, and third plurality of air columns are formed of flexible material.

9. The battery case assembly of claim 8, wherein the flexible material comprises silicone.

10. The battery case assembly of claim 1, wherein the case defines outset sections formed at transitions from the rearward wall and the first and second side walls, wherein the outset sections are shaped to receive tabs extending from the battery pack housing.

11. A battery case assembly configured to be coupled to a battery housing for an electrified vehicle, the battery case assembly comprising:

a battery case having a bottom surface, a forward wall, a rearward wall, a first side wall and a second side wall; and an air column assembly supported within the battery case and comprising:

a first plurality of air columns positioned along the bottom surface of the battery case; and a plurality of outboard air columns positioned outboard of the first plurality of air columns and that engage the forward wall, rearward wall, first side wall and second side wall of the battery case in an installed position;

wherein the battery case assembly nests laterally between the air columns of the plurality of outboard air columns, the battery case assembly thermally insulating the battery housing in the installed position.

12. The battery case assembly of claim 11, further comprising an intermediate plurality of air columns, wherein the intermediate plurality of air columns are cylindrical in shape and arranged in a side-by-side manner wherein adjacent air columns of the intermediate plurality of air columns define axes that are parallel and offset relative to each other.

13. The battery case assembly of claim 12, wherein the outboard plurality of air columns are cylindrical in shape and arranged in a side-by-side manner wherein adjacent air columns of the outboard plurality of air columns define axes that are parallel and offset relative to each other.

14. The battery case assembly of claim 13, wherein the air columns of the outboard plurality of air columns are smaller in diameter and longer in length than the air columns of the intermediate plurality of air columns.

15. The battery case assembly of claim 12, wherein the air columns of the first, intermediate, and outboard plurality of air columns are formed of flexible material.

16. The battery case assembly of claim 15, wherein the flexible material comprises silicone.

17. The battery case assembly of claim 11, wherein the case defines outset sections formed at transitions from the rearward wall and the side walls, wherein the outlet sections are shaped to receive tabs extending from the battery pack housing.

* * * * *